US010545989B1

(12) United States Patent
Cheng et al.

(10) Patent No.: US 10,545,989 B1
(45) Date of Patent: Jan. 28, 2020

(54) SELECTIVE DATA REPLICATION

(71) Applicant: Amazon Technologies, Inc., Seattle, WA (US)

(72) Inventors: Pablo Puo Hen Cheng, Pomona, CA (US); Rosen Ognyanov Baklov, Lake Forest, CA (US); Igor Gorelik, Irvine, CA (US); Jesse Aaron Van Beurden, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 833 days.

(21) Appl. No.: 14/954,223

(22) Filed: Nov. 30, 2015

(51) Int. Cl.
*G06F 16/27* (2019.01)
*H04L 29/08* (2006.01)
*G06F 16/23* (2019.01)

(52) U.S. Cl.
CPC .......... *G06F 16/27* (2019.01); *G06F 16/2358* (2019.01); *H04L 67/1097* (2013.01); *H04L 67/32* (2013.01)

(58) Field of Classification Search
CPC .............. G06F 17/30867; G06F 9/546; G06F 17/39699; G06F 17/30572; G06F 16/27; G06F 16/2358; H04L 67/1097; H04L 67/32
See application file for complete search history.

(56) References Cited

U.S. PATENT DOCUMENTS

| | | | | |
|---|---|---|---|---|
| 6,449,723 B1* | 9/2002 | Elgressy | ................. | G06F 21/51 709/224 |
| 7,664,125 B1* | 2/2010 | Bauer | ................. | H04L 41/0233 370/408 |
| 8,571,882 B1* | 10/2013 | Teitelbaum | ....... | G06F 17/30292 705/2 |
| 2010/0036850 A1* | 2/2010 | Garman | ................ | G06F 9/5016 707/636 |
| 2013/0044106 A1* | 2/2013 | Shuster | ................... | G06T 19/20 345/419 |
| 2015/0139228 A1* | 5/2015 | Wijnands | .............. | H04L 12/185 370/390 |

* cited by examiner

*Primary Examiner* — James Trujillo
*Assistant Examiner* — Fatima P Mina
(74) *Attorney, Agent, or Firm* — BakerHostetler

(57) ABSTRACT

Computer implemented systems and methods for distributing replica chunks are disclosed. Computing nodes in the network are assigned to zones that correspond to functions performed by the nodes in the network. Replica chunks are likewise associated with the zones that are typically used in processing the replica chunks. When the owner of a replica chunk identifies a new node, it distributes to the new node those replica chunks that are associated with a zone that matches the zone associated with the new node. The owner of the replica chunk is further programmed to receive requests from nodes to subscribe to a data chunk. The node replicates the data chunk to those nodes in the network that have subscribed to the data chunk. When a node no longer requires access to a data chunk, the node unsubscribes from receiving the data chunk.

9 Claims, 8 Drawing Sheets

SELECTIVE DATA REPLICATION

BACKGROUND

In networked computer environments, multiple computing nodes frequently require access to the same data. For example, in a network environment that provides on-line gaming services, multiple computing nodes in the network may require access to data relevant to a particular character, player, or object in a game scene.

One methodology for providing multiple computing nodes with access to data relevant to a particular character or object is to replicate all data to all nodes in the network. In other words, a copy of the data object is made on each node in the network. By providing a copy of the data object on all computing nodes in the network, each of the nodes has ready access to the data.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

DETAILED DESCRIPTION

Figure 1:
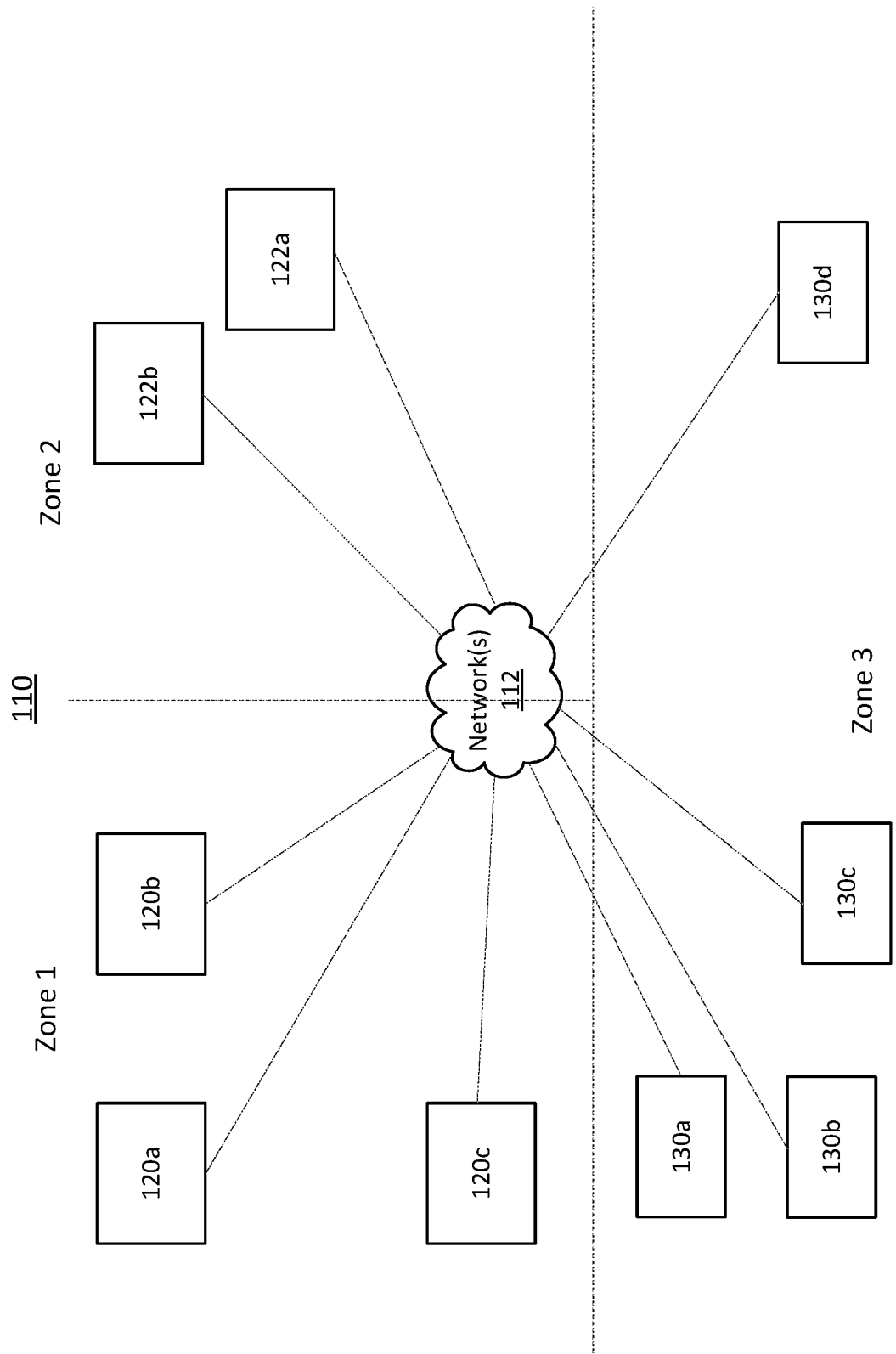
FIG. 1 depicts an example computer network.

In a typical data replication model for copying data objects in a distributed computing environment, copies of data objects are made on each node in the network. Accordingly, when a new data object is created in the network of nodes, a copy of the new data object is distributed across the network to each node. When a change occurs to an existing data object, that change is communicated to all of the copies existing on all of the nodes in the network.

As the number of objects in the system increases and the number of computing nodes in the system increases, the amount of network and computing bandwidth needed to distribute data objects and updates to data object increases dramatically. The bandwidth devoted to distributing and updating data objects may become so large that it interferes with the processing for which the network was intended.

Applicants disclose herein systems and methods for selectively distributing data to nodes in a network. According to one aspect of the disclosed embodiments, computing nodes in the network are assigned to groupings, which may be referred to as zones, that correspond to the functions that the nodes perform in the network. Data objects that are typically used in performing a particular function are marked with the particular zone that corresponds to the function. A computing node that is the owner or master of a data object distributes the data object to a newly identified node in the network upon determining that the grouping to which the new node is assigned corresponds to the grouping assigned to the particular data object.

According to another aspect of the disclosed embodiments, the owner of a data object distributes the data object to nodes in response to requests to subscribe to the particular data object. When a node determines that it has a need for a data object, even if only temporary, the node transmits a request to subscribe to the object to the owner of the data object. The owner of the object adds the node to the subscription list and replicates the subscribed-to data object to the node. When the node no longer requires access to the data object, it communicates a request to unsubscribe to the object owner which causes the object owner to remove the node from the subscription list.

In an example embodiment, the functional operations performed on data in a network are organized into entities and the data on which the operations are performed are organized into replicas. The entities may be thought of as containers of functionality, while the replicas are containers of corresponding data. An entity typically has no functional logic itself but is defined to group related sets of functionality which may be referred to as components. Each component is a self-contained object that gives the entity some form of behavior. In an example gaming scenario, an entity may be defined to group functionality associated with an AI controller which provides simulation functionality for a computer-controlled character in an on-line game. The entity has components associated with it that correspond to the particular segments of functionality. For example, in the scenario where an entity is defined to group functionality associated with an AI controller, components contained in the entity may be comprise: an AI controller component programmed to provide functionality for simulating physics operations associated with a character; a unit property component for providing functionality associated with features of the object such as location and health; a shopkeeper component for providing functionality associated with a virtual shopkeeper character; an inventory component that provides functionality for interfacing with a shopkeeper's inventory; and a replica component that handles bridging between the entity and a corresponding replica.

Each entity has a corresponding replica. A replica is a container of blocks of data, which may be referred to as replica chunks. Each replica chunk corresponds to one of the components defined in the corresponding entity. For example, a replica corresponding to the above-described entity for grouping functionality related to an AI controller may comprise the following replica chunks that correspond to the components defined for the entity: an AI controller chunk for holding data related to simulating physics operations; a unit property chunk which holds data related to basic features of the object such as location and health; a shopkeeper chunk for holding data related to a particular shopkeeper character in an on-line game; an inventory chunk for storing data relating to the inventory of the shopkeeper character; and a replica component chunk which contains data and functionality for generating or retrieving components that correspond to particular chunks as described below.

Replica chunks may be distributed in a network of nodes based upon the particular zone with which a node may be associated. In an example embodiment, computing devices, which may be referred to herein as peers or nodes, are associated with particular zones in the network. Zones are user-definable and may be defined in any suitable manner including, for example, based upon the type of functions or operations that particular devices perform in the network. Each zone generally has a different function or meaning to other zones in the network. In an on-line gaming environment, a first zone may be defined for grouping computing peers or nodes that are used primarily to perform simulation processing for game characters. A second zone may be defined for peers or nodes that are devoted primarily to performing database storage and retrieval operations. Nodes that are used by players in an on-line gaming environment may be grouped into a third zone. It will be appreciated that a user may define as many or as few zones as needed. In an example embodiment, computing nodes may be assigned to one or more zones by the system based upon operating data. For example, using historical usage data for a particular node, the system may determine that the particular node performs a particular set of functions in the system and, therefore, should be designated as belonging to a corresponding zone. In an example scenario, a system may determine that a particular computing node is performing functions typically associated with a user gaming device and, therefore, associate the particular node with the zone to which user gaming devices are typically associated.

The replica chunks are likewise associated with zones. At the time that a replica and its corresponding chunks are defined for use in a system, it is typically understood how the particular replica chunks will be used in the system and which types of nodes would likely process the replica chunks. Accordingly, the same zones that are associated with the nodes in the network are also associated with replica chunks that are typically operated upon by the nodes. In an example scenario, a replica chunk such as an AI controller chunk which typically is used by a simulation server in a network, may be associated with the particular zone to which simulation servers are assigned. A replica chunk such as, for example, a unit property component which is typically maintained by a database server in a network, may be associated with the particular zone to which database servers are assigned.

When the owner of a replica becomes aware of a node or peer in the network, the owner of the replica identifies the zone associated with the new node and evaluates that zone against those associated with the owner's replica chunks. Where the zone associated with a particular replica chunk matches the zone associated with the node, the owner of the replica transmits or replicates the replica chunk to the node. In an example scenario, an owner of a replica may contain data indicating an AI controller replica chunk is associated with zone 1, while an inventory replica chunk which is part of the same replica is not associated with any zones. In the situation that the owner of the replica receives information identifying a new node associated with zone 1, the owner of the replica marks the AI controller replica chunk to be replicated to the new node while the inventory replica chunk is not marked for replication. Accordingly, when the transmission or replication of the replica is performed, the AI controller replica chunk is transmitted to the new node, while the inventory replica chunk is not. By using the zone designations associated with network nodes and replica chunks, data is distributed to the particular machines or nodes that typically require the particular data in order to operate. Unnecessary movement and storage of data is reduced.

Replica data may also be distributed in a network of nodes based upon whether a particular node has subscribed to receive a particular replica chunk. In an example embodiment, a node in the network may become aware of a replica chunk that the node requires for processing. For example, in the context of a network for providing on-line gaming, a node that is executing a player controller component may interface with a shopkeeper component that represents a character in an on-line virtual world. As a result of this interaction, the player controller component may become aware of an inventory replica chunk that contains data relating to the inventory of the shopkeeper. In response to becoming aware of the inventory replica chunk, the player node generates a request to the owner of the inventory replica chunk requesting to subscribe to the inventory replica chunk.

The request to subscribe is received at the owner of the replica chunk. The owner confirms that the requesting node is one that should receive the particular replica chunk. For example, in the scenario where the node has requested to subscribe to an inventory replica chunk, the owner may confirm that the position of the player controller executing on the node is in the vicinity of the shopkeeper whose inventory the node is requesting. After confirming the requesting node should receive the requested replica chunk, the owner updates the information in its subscription list associated with the particular replica chunk to indicate that the requesting node should receive the replica chunk. In the example scenario, the owner of the inventory replica chunk updates the subscription list maintained for the inventory replica chunk to indicate that the requesting node has subscribed. Thereafter, when the replica owner refreshes the replication of the replica, the inventory replica chunk is transmitted to the requesting node.

In some instances, the data comprised in a replica chunk may be operated upon or accessed using a corresponding entity component. For example, an inventory component may be needed in order to access and interact with the data comprised in an inventory replica chunk. Accordingly, when a node subscribes to and receives such a replica chunk, the node may also receive a replica component chunk. The replica component chunk comprises executable logic or code for obtaining the corresponding component. For example, in the scenario where the inventory replica chunk has been subscribed to, the replica component chunk obtains the corresponding inventory component. The node may use the inventory component chunk to interface with the inventory replica chunk.

Example Computing Network

FIG. 1 is a diagram illustrating an example computing network suitable for selectively distributing replica chunks. In an example scenario, computing network 110 may be adapted to provide an on-line service or functionality. For example, network 110 may be adapted to provide processing for on-line gaming. In such a scenario, requests from client devices may be processed by nodes on network 110 in order to provide simulation in support of an on-line game. Data objects may be used by the nodes in the network to represent objects in a virtual world depicted in an on-line game.

As shown in FIG. 1, a plurality of computing systems 120*a-c* are communicatively coupled to network 112. In an example embodiment, computing systems 120*a-c* may be programmed to provide processing relating to an on-line or cloud service. For example, computing systems 120*a-c* may operate as simulation servers as part of an on-line gaming service and may be programmed to perform physics calculations and simulate physical interactions between objects. Computing systems 120*a-c* may comprise any suitable combination of hardware and software. In an example scenario, computing systems 120*a-c* may be implemented using virtual servers in a web services computing environment.

Computing systems 122*a-b* are likewise communicatively coupled to network 112 and programmed to provide processing relating the on-line or cloud service. In an example embodiment, computing systems 122*a-b* may operate as database servers in connection with an on-line gaming service and may be programmed to perform database operations for storing and retrieving data. Computing systems 122*a-b* may comprise any suitable combination of hardware and software. In an example scenario, computing systems 122*a-b* may be implemented using virtual servers in a web services computing environment.

Client computing systems 130 are communicatively coupled to network 112 and are programmed to access services and data provided by network 110. In an example embodiment wherein computing systems 120*a-c* are programmed to operate as simulation servers as part of an on-line gaming service, client computing systems 130 may be programmed to access data objects and processing provided by computing systems 120*a-c*. More particularly, client computing systems 130 may be used to play on-line games, the processing for which is provided, in part, by computing systems 120*a-c*. Client computing systems 130 may comprise any combination of hardware and software suitable to perform processing as described herein. For example, client computing systems 130 may comprise user devices such as desktop or laptop computers, pad devices, and/or phone devices.

Client computing systems 130 may be communicatively coupled in any suitable manner to computing systems 120*a-c*, 122*a-b*. In an example embodiment, client computing systems 130 communicate with computing systems 120*a-c*, 122*a-b* via network 112, which may comprise the Internet and/or any suitable networking topology including Web protocols.

It will be appreciated that nodes in the network may be grouped or classified by any number of classifications. For example, the nodes may be classified based upon the function that the particular node performs in the network. In the example embodiment depicted in FIG. 1, computing nodes 120*a-c*, which are programmed to provide on-line game simulation functionality, have been logically grouped together as belonging to Zone 1. Computing nodes 122*a-b* are programmed to provide database features and have been logically grouped together as belonging to Zone 2. Finally, computing nodes 130*a-d*, which are programmed to provide player controller functionality, have been logically grouped together as belonging to Zone 3. Dotted lines in FIG. 1 illustrate the logical separation between zones.

It will be appreciated that in some scenarios a node may perform varied functions and, therefore, may be assigned to more than one grouping or zone. Furthermore, the zones or groupings may be user-defined. There may be as many or as few as needed. Each of nodes 120*a-c*, 122*a-b*, and 130*a-d* has data stored thereon that designates which zone(s) the particular node has been grouped in. In an example embodiment, the data designating a zone is stored as a bit mask which is used to evaluate whether or not a particular replica chunk should be transmitted to a particular device. For example, each of nodes 120*a-c* may comprise a bit mask designating the nodes are in a common group or zone within the network. Similarly, nodes 122*a-b* and nodes 130*a-d* may have bit masks stored thereon indicating the particular zone or grouping within the network to which the nodes have been assigned. In some network configurations, particular computing nodes may not be "trusted." For example, client nodes that are communicatively coupled to a network via an external gateway may not be considered trusted devices with respect to the network. In such configurations, the last "trusted" node before reaching the untrusted nodes, ensured that the nodes with which it communicates is correctly defined for purposes of zones.

Example Data Structure

Figure 2:
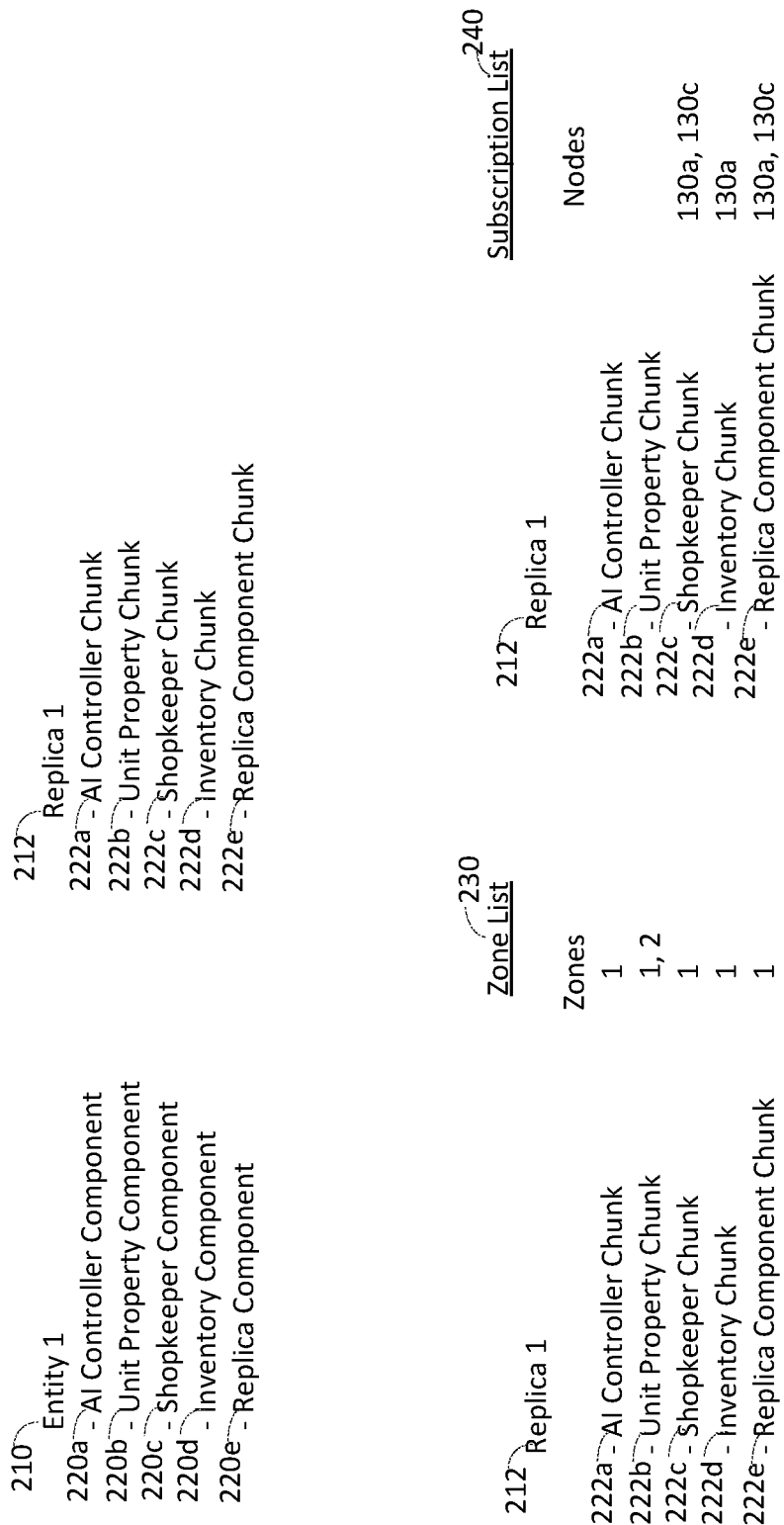
FIG. 2 depicts an example entity and replica.

Functional features or logic performed in system 110 may be organized into entities, while the data operated on by the entities is organized into replicas. Each entity has a corresponding replica. FIG. 2 depicts an example entity 210 and replica 212 pair that may be operated upon by the nodes in system 110. It will be appreciated that while FIG. 2 depicts aspects of a single entity and replica, numerous entities and replicas may exist in an operating system and on a particular node in the system. In the example embodiment illustrated in FIG. 2, entity 210 comprises components 220*a-e*, each of which represents a set of logic or functionality relating to simulating a character in a virtual game world. In the illustrated example, entity 210 comprises: AI controller component 220*a* which contains executable instructions for simulating physics operations associated with a character; unit property component 220*b* which contains executable instructions for providing features relating to the location and health of the character; shopkeeper component 220*c* which contains executable instructions associated with a virtual shopkeeper character; inventory component 220*d* which contains executable instructions for managing and interfacing with a shopkeeper's inventory; and replica component 220*e* which contains executable instructions for bridging between entity 210 and replica 212. In an example embodiment, replica component 220*e* is responsible for creating replica 212 and the replica chunks that correspond to each of components 220*a-d*.

Replica 212 is a container of blocks of data, which may be referred to as replica chunks 222*a-e*. Each replica chunk 222*a-e* corresponds to one of components 220*a-e* defined in corresponding entity 210. In the example scenario depicted in FIG. 2, replica 212 comprises the following replica chunks: AI controller replica chunk 222*a* comprising data used by AI controller component 220*a* to simulate physics operations; unit property replica chunk 222*b* comprising data used by unit property component 220*b* and relating to features such as location and health; shopkeeper replica chunk 222*c* comprising data used by shopkeeper component 220*c* and relating to the details of a particular shopkeeper character; an inventory replica chunk 222*d* comprising data used by inventory component 220*d* and relating to the inventory of a particular shopkeeper; and replica component chunk 222*e* which contains data and functionality for generating or retrieving components that correspond to a particular chunk that has been received at a node from the owner/master node. As described below, when a replica chunk is received at a node, the replica component chunk 222*e* may also be received. The replica component chunk 222*e* obtains the particular component that corresponds to the received replica chunk. For example, in the scenario where inventory chunk 222*d* has been received at a node, replica component chunk 222*e* generates or retrieves inventory component 220*d*.

Replica data may be distributed in a network of nodes based upon the particular zone with which a node may be associated. As noted in above in connection with FIG. 1, computing nodes may be associated with particular zones, where the zones are defined in any suitable manner including, for example, based upon the type of functions or operations that particular devices perform in the network. Replica chunks that are defined in the system likewise may be associated with zones. At the time that a replica and its corresponding chunks are defined for use in a system, it is typically understood how the particular data chunks will be used in the system and which types of nodes would likely process the data chunks. Accordingly, the same zones that are associated with the nodes in the network may also be associated with data chunks that are typically operated upon by the nodes.

FIG. 2 illustrates an example scenario wherein groupings or zones have been associated with particular replica chunks. More particularly, and as illustrated, each replica chunk has an associated zone list 230 that identifies the particular zone most likely associated with computing nodes that process the particular replica chunk. As shown, AI controller replica chunk 222a, which typically is used by simulation servers in a network, may be associated with zone 1 which is the particular zone to which simulation servers are assigned. Unit property replica chunk 222b, which is processed by simulation servers but also heavily used by database servers in a network, is associated in its zone list with zone 1 corresponding to simulation servers as well as with zone 2 which is the zone to which database servers are assigned. Shopkeeper chunk 222c, inventory chunk 222d, and replica component chunk 222e are all associated with zone 1 corresponding to simulation servers which are typically responsible for performing processing related to the replica 212. While the illustrative embodiment of FIG. 2 lists zones by a decimal value, e.g. 1, 2, etc., it will be appreciated that any suitable values may be used. For example, a bit value. e.g., base 2 value, may be used to designate the particular zone that is associated with a replica chunk. The bit value may be part of a bit mask associated with the particular replica chunk. A bit mask associated with the replica chunk may be compared with a bit mask associated with nodes to determine whether the zones that are represented by the bit masks match each other.

It will be appreciated that a particular chunk may be associated with more than one zone or grouping in circumstances where the chunk is used by nodes with different purposes. It will similarly be appreciated that some replica chunks are not regularly processed by a node of a particular type or grouping. Accordingly, these replica chunks are not distributed or replicated based upon the grouping or zone of the nodes in the network and, therefore, may not have an associated zone. Data designating a zone for a particular replica chunk may be associated with the replica chunks in any suitable manner. For example, data designating a corresponding zone may be stored with the replica chunk to which it is associated.

Replica chunks may also be distributed in a network of nodes based upon the particular nodes that have subscribed to receive a particular replica chunk. For example, a player controller operating on a user client node may subscribe to receive a particular chunk in response to becoming aware of the chunk during the player's progress in the game world. FIG. 2 illustrates an example embodiment of a subscription list 240 maintained by the owner of object replica 212 for each replica chunk in replica 212. As shown, shopkeeper replica chunk 222c has in its subscription list computing nodes 130a and 130c. This is an indication that computing nodes 130a and 130c have subscribed to receive shopkeeper replica chunk 222c. Inventory replica chunk 222c has in its subscription list computing node 130a, which is an indication that computing node 130a has subscribed to inventory replica chunk 222d. Replica component chunk 222e includes in its subscription list nodes 130a and 130c. In an example embodiment, replica component chunk 222e includes in its subscription list all nodes to which any of the other chunks in the replica are subscribed to.

When the owner of the replica 212 determines to which nodes it will replicate or transmit a particular replica chunk, it queries subscription list 240 in order to determine which nodes are currently subscribed. In the scenario where the owner of replica 212 queries subscription list 240 to determine which nodes are to receive an update to replica 212 and, in particular, inventory chunk 222c, the owner/controller determines that inventory chunk 222c is to be received at inventory chunk 130a.

Example Data Distribution Processing

Figure 3:
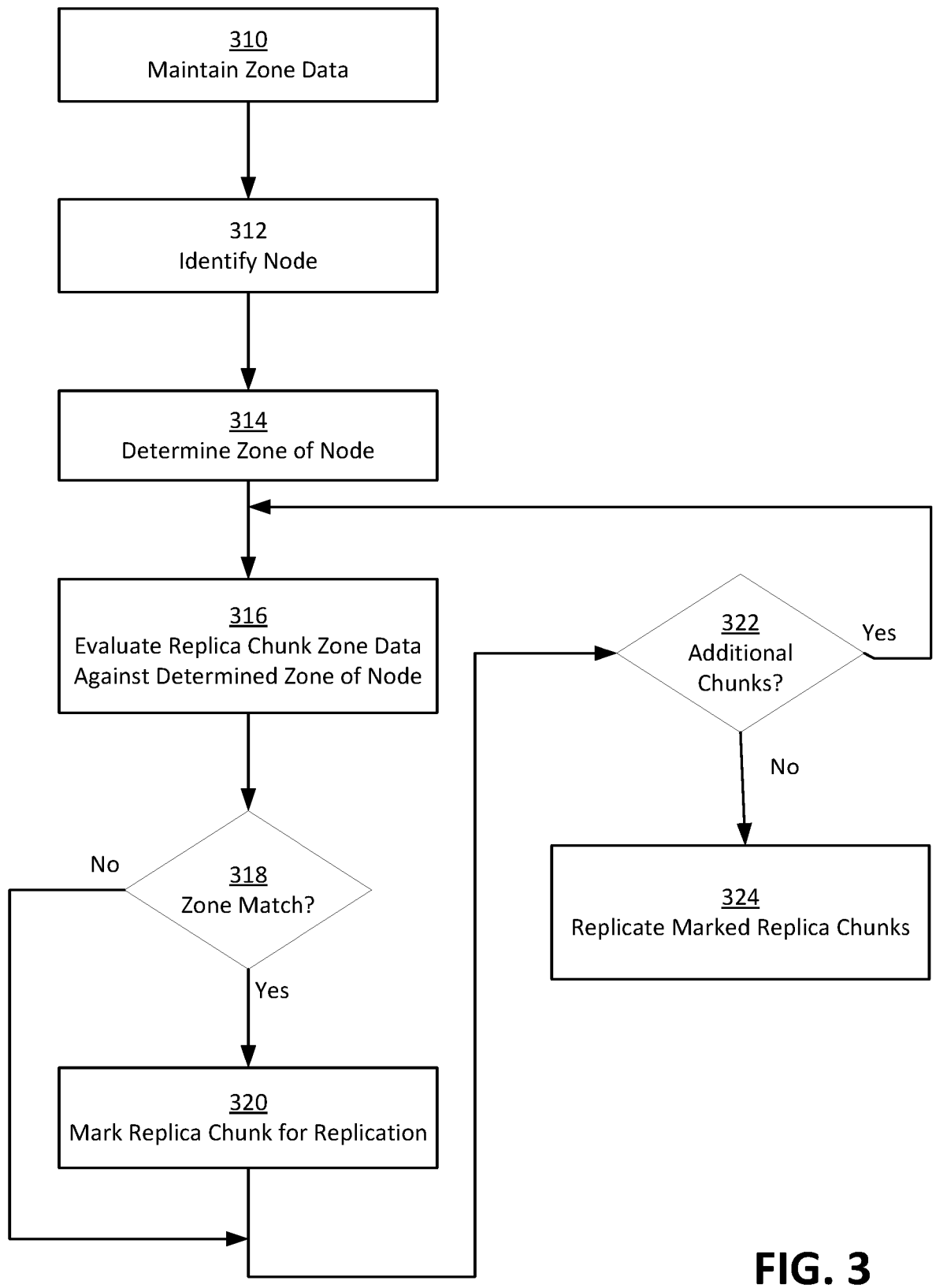
FIG. 3 depicts a flow diagram of example processing for replicating data.

FIG. 3 depicts a flow diagram of an example process for selective replication of data chunks based upon an assigned grouping or zone in the network. The processing of FIG. 3 may be referred to generally as static filtering as the processing is based upon zone designations that do not frequently change. Indeed, the zone designations assigned to nodes and replica chunks may be assigned when the nodes begin operation and when the replica chunks are defined in the system and do not typically change.

As shown, at block 310, the owner of an object maintains zone data for the replica chunks owned by the particular owner. For purposes of illustration, computing node 120a as depicted in FIG. 1, may be the owner of a replica 212 as depicted in FIG. 2 and maintains a zone list 230 for replica chunks 222a and 222b.

Referring back to FIG. 3, at block 312, the owner of a replica becomes aware of a node or peer in the network. For example, an owner of replica chunks may become aware of a new computing node that recently began operating on the network. In an example scenario, a new resource such as a new simulation server 120c as depicted in FIG. 1 may be added to network 110 in order to meet additional demand.

At block 314, the owner of the replica determines the zone that is associated with the newly identified computing node. For example, the owner may refer to a bit mask that is stored on and associated with the newly identified computing node. In the example scenario wherein simulation server 120a has identified that simulation server 120c has become active, simulation server 120a identifies that simulation server 120c is grouped in zone 1 by referring to a bit mask value stored on simulation server 120c. Simulation server 120a may determine that simulation server 120c is a simulation server and, therefore, should be classified as being in zone 1 which is reserved for nodes that perform simulation processing.

At block 316, the replica owner evaluates the replica chunks to determine if the replica chunks correspond to the identified zone of the identified computing node. In an example embodiment, the replica owner may query data stored with the replica chunks that designates zones with which each chunk is associated. In the scenario wherein computing node 120a has identified that computing node 120c has been added to the network and designated as belonging to zone 1, node 120a evaluates replica 222 and each of chunks 222a-e to identify if any have been associated with zone 1. In the example embodiment wherein the zones have been identified in the system using bit values in bit mask, the processing at block 316 may involve performing a bitwise operation comparing the zone associated with the computing node and the zones associated with the replica chunks.

At block 318, the replica owner determines whether there is a match between the zone of the newly identified node and a particular replica chunk. In the example scenario wherein computing node 120a is evaluating AI controller chunk 222a, computing node 120a may determine at block 318 that there is a match between the associated zone (which is zone 1) and the zone of new computing node 120c. In the example scenario wherein computing node 120a is evaluating another data chunk that does not list zone 1 in its zone list, computing node may determine at block 318 that there is no match between the associated zone and the zone of new computing node 120c. If at block 318 a match is found, processing continues at block 320. If no match is found between a particular replica chunk and the zone of the new computing node, processing continues at block 322.

At block 320, the replica owner node marks the particular replica chunk for replication. In the example scenario wherein computing node 120a has determined that both AI controller replica chunk 222a and computing node 120c are associated with zone 1, computing node 120a designates that AI controller replica chunk 222a should be replicated to node 120c.

At block 322, the replica owner determines whether there are additional replica chunks to evaluate for purposes of matching the zone of the new node. In an example scenario, computing node 120a determines whether there are additional replica chunks in replica 222 that require evaluation. If there are additional replica chunks that require evaluation, processing continues at block 316. If there are no additional replica chunks that require evaluation, processing continues at block 324.

At block 324, the replica owner replicates or transmits the replica chunks that have been marked for replication. In the example scenario wherein computing node 120a has marked replica chunk 222a for replication to computing node 120c, at block 324 computing node 120a replicates or transmits replica chunk 222a to computing node 120c.

The distribution of replica chunks based upon the matching zones or network groupings allows for distributing data to nodes that are known to typically require particular replica chunks during their ordinary operation. Matching of zones between nodes and replica chunks allows for replica chunks to be distributed where there is a known needed while also minimizing replication of replica chunks that are not needed.

Figure 4:
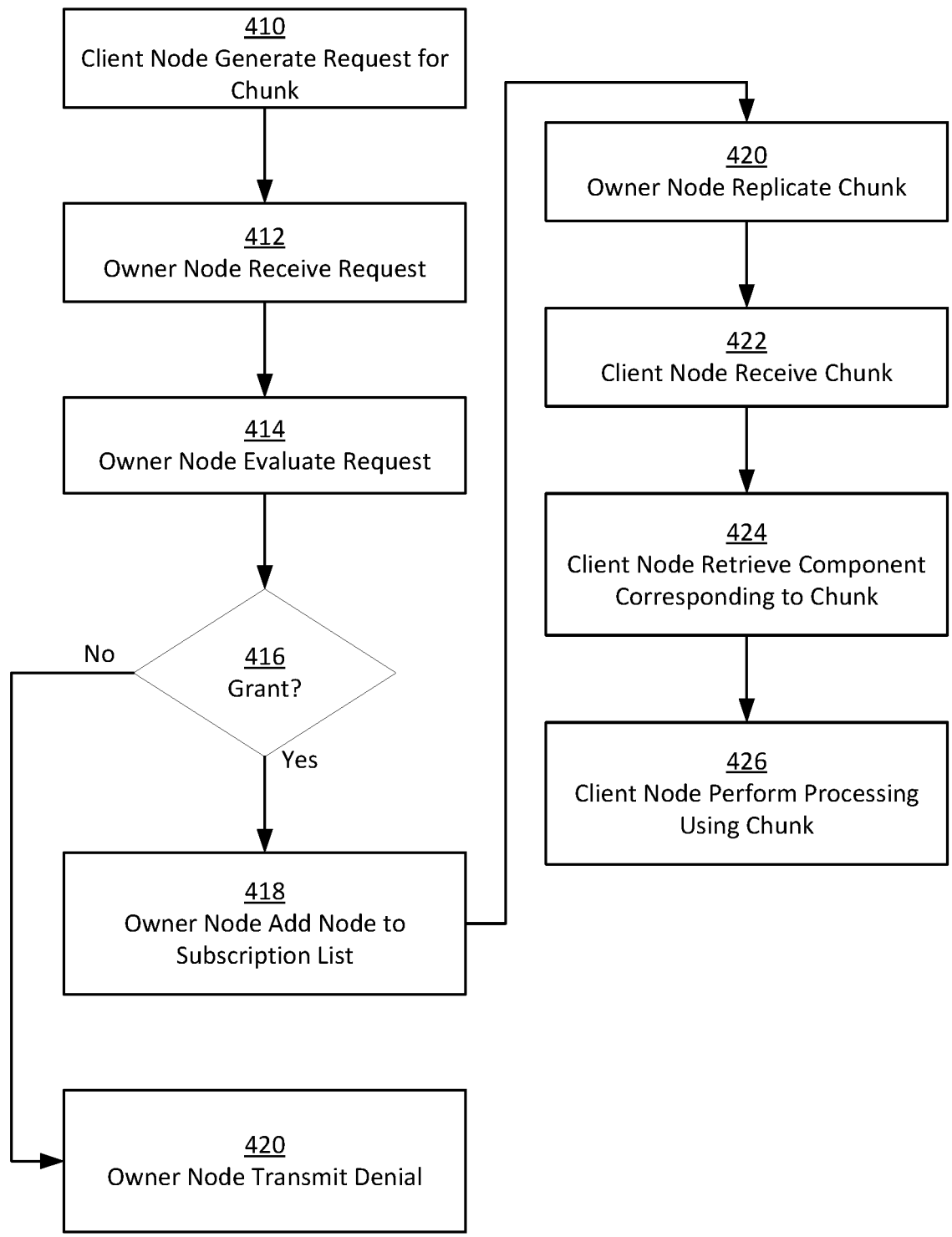
FIG. 4 depicts a flow diagram of example processing for replicating data.

In addition to distributing replica chunks based upon the zones to which nodes are assigned, the disclosed embodiments also distribute replica chunks based upon whether or not a node has subscribed to a replica chunk. The process of replicating replica chunks based upon subscription is a dynamic process as the subscriptions may change over time to reflect a node's changing needs for a particular replica chunk. FIG. 4 depicts a flow chart of an example process for distributing replica chunks based upon subscriptions to receive replica chunks. As shown, at block 410, a client computing node may generate a request for a particular replica chunk. For example, a client computing node, such as node 130a may generate a request for a particular replica chunk. In an example scenario, computing node 130a may be executing a player controller for an on-line game and may have come upon a shopkeeper character in a virtual world. Replica chunk 222c corresponding to the shopkeeper may have previously been subscribed to and received at computing node 130a. Through further manipulation by the user, the player controller may determine that the shopkeeper character has an inventory of goods and that details regarding the inventory may be accessed at inventory replica chunk 222d. As a consequence, computing node 130a generates a request to subscribe to inventory replica chunk 222d.

At block 412, the owner of the replica chunk that has been requested receives the request. In an example scenario, computing node 120a receives a request originating from node 130a to subscribe to inventory replica chunk 222d.

At block 414, the owner of the replica chunk evaluates the request. For example, the owner may evaluate whether the particular node from which the request was received is one that is entitled to receive the requested replica chunk. In an example scenario where a request for inventory chunk 222d is received at computing node 120a from computing node 130a, computing node 120a determines whether computing node 130a is executing a player controller that indicates the player is in the vicinity of the shopkeeper character whose inventory computing node 130a is requesting.

At block 416, the owner of the replica chunk that has been requested determines either to grant or deny the request. In an example scenario where computing node 120a is evaluating a request from computing node 130a to subscribe to inventory chunk 222d, computing node 120 may determine to grant the request. If the owner determines to deny the request, processing continues at block 420 where the owner controller of the requested replica chunk transmits a denial of the request. If the owner determines to grant the request, processing continues at block 418.

At block 418, the owner of the particular replica chunk modifies its data to indicate the requesting node has subscribed to the replica chunk. For example, the owner may update a subscription list that the owner maintains for each replica chunk. In an example scenario, computing node 120a updates subscription list 240 maintained for inventory replica chunk 222d to add computing node 130a to the list of subscribed nodes.

At block 420, the owner of the particular chunk replicates the particular replica chunk to the computing nodes that have subscribed to the chunk. In an example embodiment, in response to updating the subscription list for a particular replica, the owner of the replica refreshes the replication. In an example scenario, computing node 120a replicates inventory chunk 222d to requesting computing node 130a. Where the replica of which the replica chunk is a part has not previously been replicated to the particular node, in addition to replicating the subscribed-to replica chunk, the owner of the chunk replicates replica component chunk for the replica. For example, in the scenario wherein the computing node 120a replicates inventory chunk 222d to computing node 130a, computing node 120a may also replicate replica component chunk 222e.

At block 422, the computing node that requested to subscribe to the particular replica chunk receives the replica chunk. For example, where computing node 130a subscribed to inventory replica chunk 222d, computing node 130a receives inventory replica chunk 222d. In the scenario wherein computing node 130a had not previously been a recipient of replica component chunk 222e, computing node 130a also receives replica component chunk 222e. Replica component chunk 222e may be used to retrieve a component that corresponds to the received chunk.

In some instances, the computing node that receives a subscribed-to data chunk does not comprise executable code for fully interfacing with the replica chunk. For example, where computing node 130a has received an inventory replica chunk 222d which contains details regarding the inventory of a shopkeeper character that a player controller is interfacing with, computing node 130a may not have executable logic or code for interfacing with the inventory data. Accordingly, at block 424, the computing node that received the subscribed-to replica chunk obtains the component that correspond to the replica chunk. For example, where computing node 130a has subscribed to and received inventory replica chunk 222d, computing node 130a obtains the corresponding inventory component 220d. In an example embodiment, replica component chunk 222e comprises executable logic or instructions to recognize that inventory replica chunk 222d has been downloaded and that the corresponding component, inventory component 220d, does not exist on the computing node. Replica component chunk 222e contains further logic to obtain the inventory component 220d. For example, replica component chunk 222e may request and receive inventory component 220d from computing node 120a which owns replica 212 and corresponding entity 210 and its components 120a-e.

At block 426, the computing node that received the subscribed-to replica chunk may perform processing using the replica chunk. In some instances, the processing may be performed, at least in part, using a retrieved component corresponding to the retrieved data. In an example scenario wherein computing node 130a received inventory replica chunk 222d and inventory component 220d, computing node 130 may employ inventory component 220d to interface with the inventory replica chunk 222d. For example, where the player operating computing node 130a chooses to purchase an item such as a portion or armament from the shopkeeper's inventory, inventory component 220d operates on inventory replica chunk 222d so as to reflect that the inventory of the purchased item has been reduced by the amount purchased.

During the period that a computing node is subscribed to a particular replica chunk, the computing node receives updates to the replica chunk that has been received at the computing node. For example, in the scenario where computing node 130a has subscribed to and received inventory replica chunk 222d, computing node 130a will receive updates to the data comprised in inventory replica chunk 222d. In the example scenario wherein another node in the network has purchased an item in the particular shopkeeper's inventory, a reduction in the inventory is replicated to all nodes having a copy of inventory replica chunk 222d.

Figure 5:
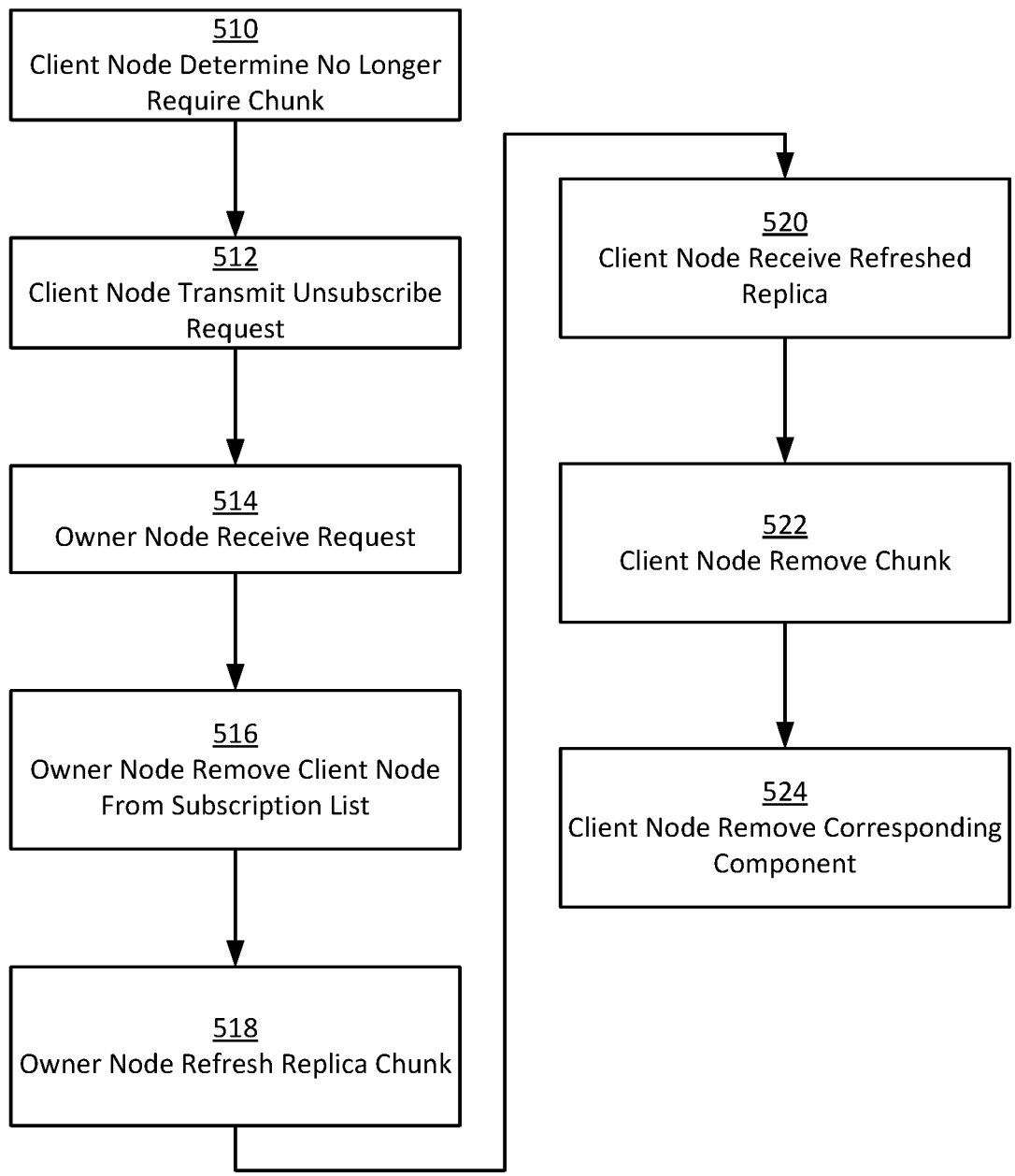
FIG. 5 depicts a flow diagram of example processing for replicating data.

A computing node may use a particular replica chunk only for a limited period of time after which it may have no need to have or receive updates regarding a replica chunk. FIG. 5 depicts an example process for a computing node to unsubscribe to a particular replica chunk. As shown, at block 510, a computing node determines that it no longer requires to be subscribed to a particular replica chunk. In the example scenario wherein computing node 130a has subscribed to and received inventory replica chunk 222d, after the game player interacts with the virtual shopkeeper character and its inventory in a virtual game world, the player may walk away from the shopkeeper character. Accordingly, computing node 130a may no longer need to have access to inventory replica chunk 222d.

At block 512, the computing node transmits a request to unsubscribe to the owner of the particular replica chunk. For example, in the scenario wherein computing node 130a is subscribed to inventory replica chunk 222d, computing node 130a generates and transmits a request to owner computing node 120a to unsubscribe.

At block 514, the owner of the particular replica chunk receives the request. For example, in the scenario wherein computing node 130a generated and transmitted a request to unsubscribe, the owner computing node 120a receives the request at block 514.

At block 516, in response to the request, the owner of the particular replica chunk modifies the relevant subscription list to remove the particular node from the list of nodes that are subscribed to the replica chunk. For example, in the scenario wherein computing node 130a is subscribed to inventory replica chunk 222d, owner node 120a modifies subscription list 240 to remove computing node 130a from the subscription list for inventory replica chunk 222d.

At block 518, the owner of the particular replica performs a replication refresh. For example, the owner transmits an update of the particular replica without the particular replica chunk that is being unsubscribed. In the scenario wherein owner node 120a has removed node 130a from the subscription list of inventory replica chunk 222d, owner node 120a sends a refreshed replica 222 to node 130a, wherein the refreshed replica does not include inventory replica chunk 222d.

At block 520, the node that requested to be unsubscribed from a particular replica chunk receives the refreshed replica. In the scenario wherein owner node 120a sends a refreshed replica 222 without replica chunk 222d, the refreshed replica is received at computing node 130a.

At block 522, the node that requested to be unsubscribed and which has received the refreshed replica 222, removes the particular replica chunk to which it has unsubscribed from any local copy of replica 222. In the scenario wherein node 130a has received a refreshed replica 222 without replica chunk 222d, replica chunk 222d is deleted from computing node 130a.

At block 524, the node that requested to be unsubscribed from receiving a particular replica chunk may also delete or remove any corresponding component that may have been obtained for the computing node. For example, in the scenario wherein computing node 130a has unsubscribed from and removed inventory replica chunk 222d, computing node 130a may also delete or remove inventory component 220d. Thereafter, the computing node that has unsubscribed may continue operating and may subsequently request to subscribe to the same or additional replica chunks as the need arises.

The distribution of replica chunks based upon subscriptions to receive replica chunks allows for dynamic distribution of data based upon a current need which may be result from player actions. The process allows for replica chunks to be distributed to where there is a current need while avoiding unnecessary distributing data.

It will be appreciated that processing such as that described above for distributing replica chunks in a network occurs continuously and dynamically. Accordingly, whenever a replica owner receives an indication of a newly identified node, the owner compares the zone of the identified zone to the zones defined for replica chunks and replicates data accordingly. Similarly, whenever a replica owner receives a request to subscribe to a particular replica chunk node, the owner adds the requesting node to the subscription list and replicates the replica chunk. Still further, whenever a request to unsubscribe from a replica chunk is received, the owner removes the node from the subscription list and ceases replicating to the particular node.

Accordingly, per the example processing illustrated in connection with FIGS. 3, 4, and 5, replica chunks are distributed to those computing nodes that either are likely to have a need for the replica chunks based upon the function performed by the node, or have indicated an immediate need for the replica chunk. Accordingly, computing nodes receive the particular data objects that the nodes require in order to provide the desired services, but additional network and processing resources are not wasted on communicating data objects that are not needed.

Example Processing Architecture

Figure 6:
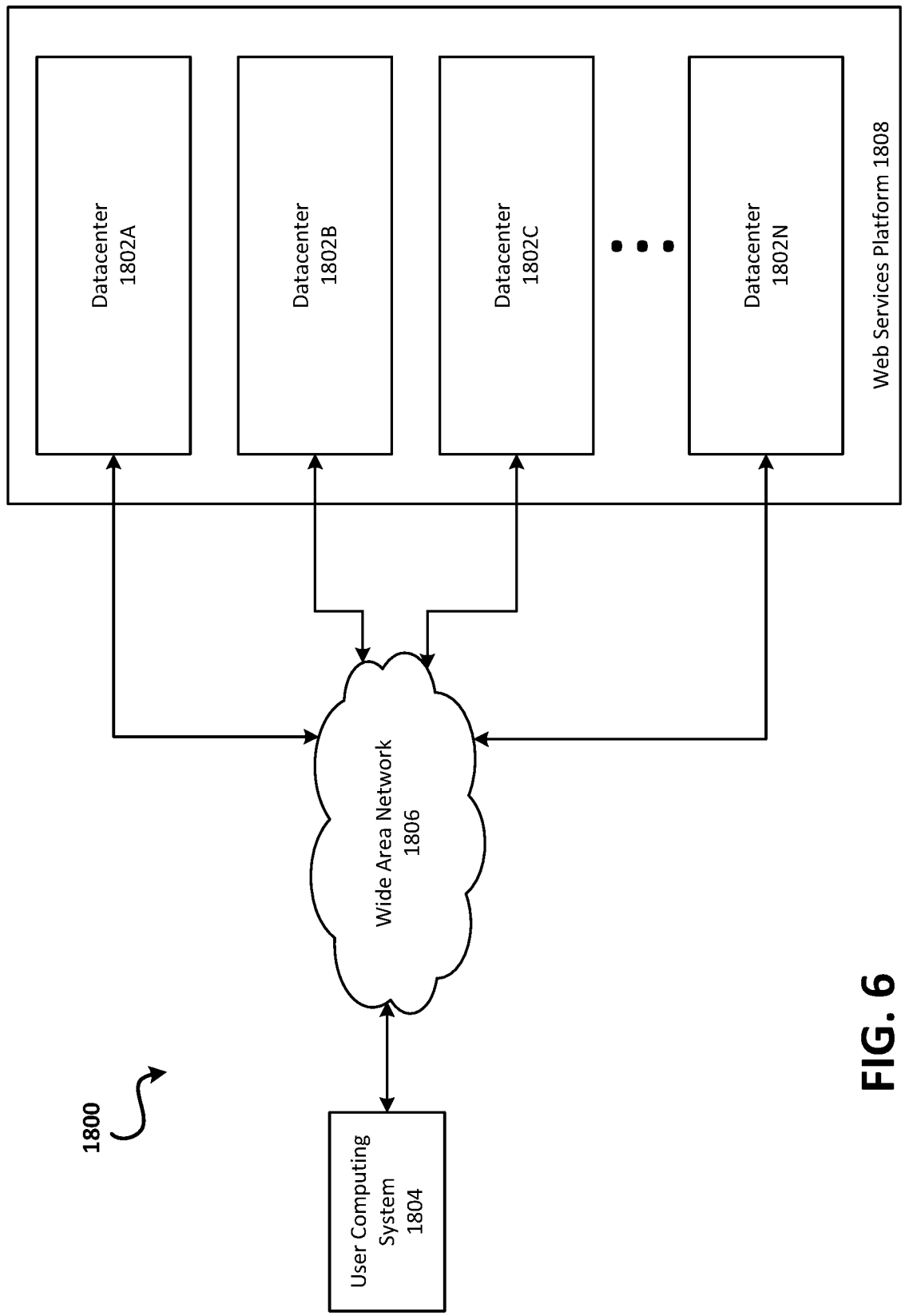
FIG. 6 depicts an example computing arrangement for implementing network accessible services.
Figure 7:
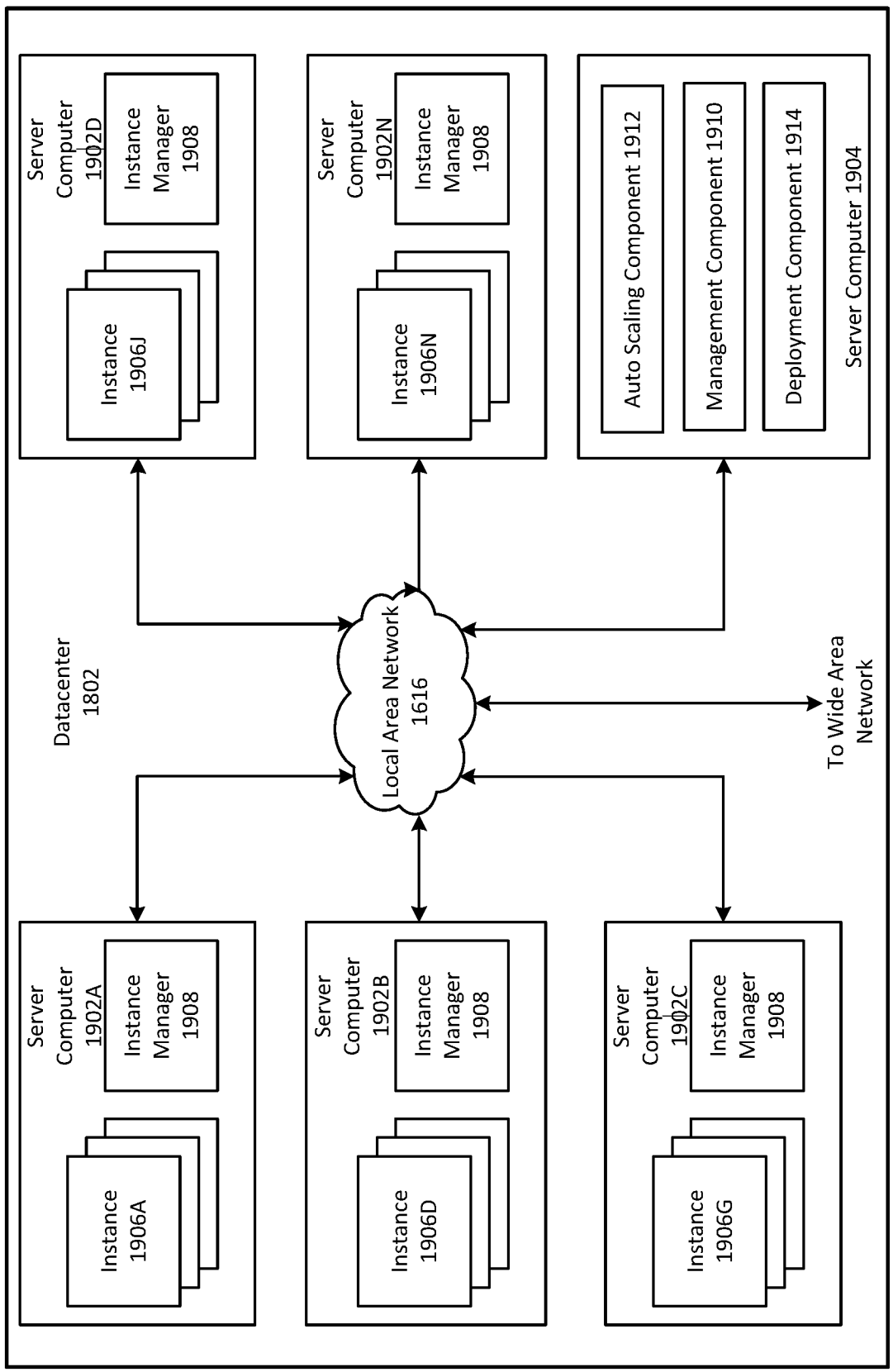
FIG. 7 depicts an example computing arrangement for implementing network accessible services.

It will be appreciated that the processing described in connection with FIGS. 3, 4, and 5 may be comprised in a system architecture adapted to provide web services or cloud based services. User devices 130 may access the architecture via network 112 which may comprise the Internet and/or World Wide Web. FIGS. 6 and 7 depict example operating environments that might be used to implement an on-line service such as those provided by system nodes 120 and 122. FIG. 6 depicts a web services platform that comprises a plurality of datacenters. FIG. 7 depicts a datacenter that comprises a plurality of computers.

Turning to the details of FIG. 6, this figure depicts an example of a suitable computing environment in which embodiments described herein may be implemented. A cloud service provider (such as web services platform 1808) may configure the illustrated computing environment to host virtual clouds of entities and to enable communication paths between these virtual clouds that may otherwise be isolated. In particular, FIG. 6 is a system and network diagram that shows an illustrative operating environment 1800 that includes a web services platform 1808 for implementing virtual clouds and for providing on-demand access to computer resources, such as virtual machine instances. Web services platform 1808 can provide computer resources for executing applications on a permanent or an as-needed basis and may be configured as a private network. These computer resources may include various types of resources, such as data processing resources, data storage resources, data communication resources, and the like. Each type of computer resource may be available in a number of configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computer resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The computer resources provided by web services platform 1808 may be enabled by one or more datacenters 1802A-1802N, which may be referred herein singularly as "datacenter 1802" or in the plural as "datacenters 1802." Datacenters 1802 may be facilities that house and operate computer systems and associated components and may include redundant and backup power, communications, cooling, and security systems. Datacenters 1802 may be located in a same geographical area, such as in a same facility, and may be interconnected using private networks, such as high-speed fiber optic networks, controlled and managed by a service provider of web services platform 1808. Datacenters 1802 may also be distributed across geographically disparate locations and may be interconnected in part using public networks, such as the Internet. One illustrative configuration for datacenter 1802 that implements the concepts and technologies disclosed herein is described below with regard to FIG. 7.

Entities of web services platform 1808 may access the computer resources provided by datacenters 1802 over a Wide Area Network (WAN) 1806. Although a WAN is illustrated in FIG. 6, it should be appreciated that a Local Area Network (LAN), the Internet, or any other networking topology known in the art that connects datacenters 1802 to remote entities and other users may be utilized. It should also be appreciated that combinations of such networks may also be utilized.

An entity or other entities that are users of web services platform 1808 may utilize a computing system 1804 to access the computer resources provided by datacenters 1802. User computing system 1804 comprises a computer capable of accessing web services platform 1808, such as a server computer, a desktop or laptop personal computer, a tablet computer, a wireless telephone, a PDA, an e-reader, a game console, a set-top box, an automobile, an automobile system, a home appliance, a manufacturing device or sensor, a building control system, a farming instrument, or any other computing node or thing that is able to communicate with data center 1802. In an example scenario, computing system 1804 may correspond, for example, devices 130 described above.

In an example scenario, a particular user computing system 1804 may be utilized to configure aspects of the computer resources provided by web services platform 1808. In this regard, web services platform 1808 may provide a web interface through which aspects of its operation may be configured through the use of a web browser application program executing on user computing system 1804. Alternatively, a stand-alone application program executing on user computing system 1804 may access an application programming interface (API) exposed by web services platform 1808 for performing the configuration operations. Other mechanisms for configuring the operation of web services platform 1808, including launching new virtual machine instances on web services platform 1808, may also be utilized.

According to embodiments disclosed herein, capacities of purchased computer resources provided by web services platform 1808 can be scaled in response to demand. In this regard, scaling refers to the process of instantiating, which may also be referred to herein as "launching" or "creating," or terminating, which may also be referred to herein as "de-scaling," instances of computer resources in response to demand.

Web services platform 1808 may also be configured with a deployment component to assist entities in the deployment of new instances of computer resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of computer resources.

FIG. 7 depicts a computing system diagram that illustrates one configuration for datacenter 1802 that implements web services platform 1808. The example datacenter 1802 shown in FIG. 7 may include several server computers 1902A-1902N, which may be referred herein singularly as "server computer 1902" or in the plural as "server computers 1902," for providing computer resources for hosting virtual clouds and for executing applications. Server computers 1902 may be standard tower or rack-mount server computers configured appropriately for providing the computer resources described above. For instance, in one implementation server computers 1902 may be configured to provide instances 1906A-1906N of computer resources.

Instances 1906A-1906N, which may be referred herein singularly as "instance 1906" or in the plural as "instances 1906," may be virtual machine instances. As known in the art, a virtual machine instance is an instance of a software implementation of a machine (i.e., a computer) that executes programs like a physical machine. In the example of virtual machine instances, each server 1902 may be configured to execute an instance manager 1908 capable of executing the instances. Instance manager 1908 may be a hypervisor or another type of program configured to enable the execution of multiple instances 1906 on a single server 1902, for example. As discussed above, each of instances 1906 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 1802 shown in FIG. 7 may also include a server computer 1904 reserved for executing software components for managing the operation of datacenter 1802, server computers 1902, and instances 1906. In particular, server computer 1904 may execute a management component 1910. As discussed above, working between FIGS. 6 and 7, an entity of web services platform 1808 may utilize user computing system 1804 to access management component 1910 to configure various aspects of the operation of web services platform 1808 and instances 1906 purchased by the entity. For example, the entity may purchase instances and make changes to the configuration of the instances. The entity may also specify settings regarding how the purchased instances are to be scaled in response to demand. The entity may also provide requests to launch instances to management component 1610.

As also described briefly above, an auto scaling component 1912 may scale instances 1906 based upon rules defined by an entity of web services platform 1908. For example, auto scaling component 1912 may allow an entity to specify scale up rules for use in determining when new instances should be instantiated and scale down rules for use in determining when existing instances should be terminated.

As discussed briefly above, datacenter 1802 may also be configured with a deployment component 1914 to assist entities in the deployment of new instances 1906 of computer resources. Deployment component 1914 may receive a configuration from an entity that includes data describing how new instances 1906 should be configured. For example, the configuration may specify one or more applications that should be installed in new instances 1906, provide scripts and/or other types of code to be executed for configuring new instances 1906, provide cache warming logic specifying how an application cache should be prepared, and other types of information.

Deployment component 1914 may utilize the entity-provided configuration and cache warming logic to configure, prime, and launch new instances 1906. The configuration, cache warming logic, and other information may be specified by an entity using management component 1910 or by providing this information directly to deployment component 1914. Other mechanisms may also be utilized to configure the operation of deployment component 1914.

In the example datacenter 1802 shown in FIG. 7, an appropriate LAN 1916 may be utilized to interconnect server computers 1902A-1902N and server computer 1904. LAN 1916 may also be connected to WAN 1806 illustrated in FIG. 6. It should be appreciated that the network topology illustrated in FIGS. 6 and 7 has been greatly simplified and that many more networks and networking devices may be utilized to interconnect the various computing systems disclosed herein. Appropriate load balancing devices or software modules may also be utilized for balancing a load between each of datacenters 1802A-1802N, between each of server computers 1902A-1902N in each datacenter 1802 and between instances 1906 purchased by each entity of web services platform 1808. These network topologies and devices should be apparent to those skilled in the art.

It should be appreciated that datacenter 1802 described in FIG. 7 is merely illustrative and that other implementations may be utilized. In particular, functionality described herein as being performed by management component 1910, auto scaling component 1912, and deployment component 1914 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

Figure 8:
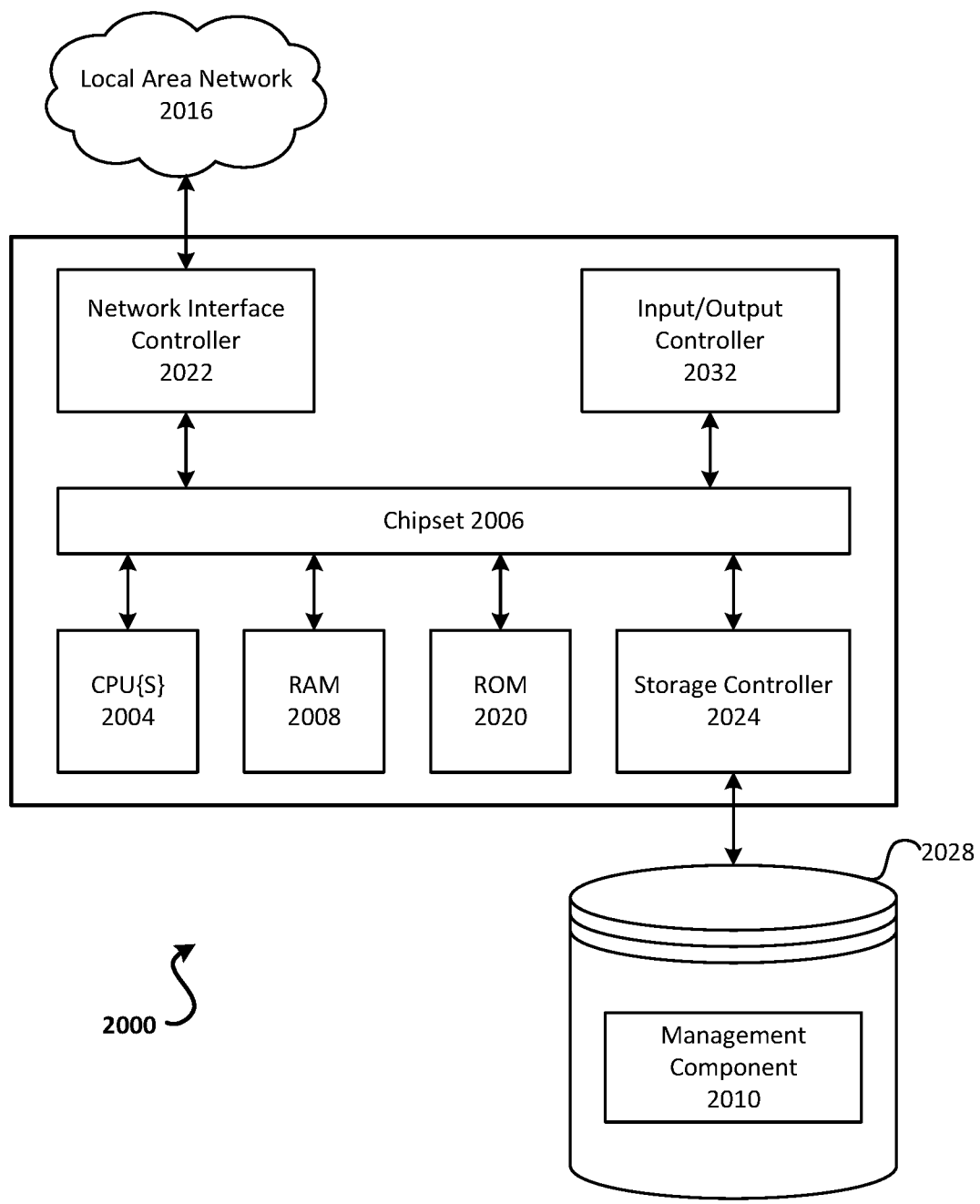
FIG. 8 depicts an example computing system.

FIG. 8 depicts an example computer architecture for a computing system 2000 capable of executing software for performing operations as described above in connection with FIGS. 1-7. The computer architecture shown in FIG. 8 illustrates a conventional server computer, workstation, desktop computer, laptop, tablet, network appliance, PDA, e-reader, digital cellular phone, or other computing node, and may be utilized to execute any aspects of the software components presented herein described as executing on servers 120a-c and 122a-b, on devices 130, within datacenters 1802A-1802N, on server computers 1902A-1902N, or on any other computing system mentioned herein.

Computer 2000 may include a baseboard, or "motherboard," which is a printed circuit board to which a multitude of components or devices may be connected by way of a system bus or other electrical communication paths. One or more central processing units (CPUs) 2004 may operate in conjunction with a chipset 2006. CPUs 2004 may be standard programmable processors that perform arithmetic and logical operations necessary for the operation of computer 2000.

CPUs 2004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 2006 may provide an interface between CPUs 2004 and the remainder of the components and devices on the baseboard. Chipset 2006 may provide an interface to a random access memory (RAM) 2008 used as the main memory in computer 2000. Chipset 2006 may further provide an interface to a computer-readable storage medium, such as a read-only memory (ROM) 2020 or non-volatile RAM (NVRAM) (not shown), for storing basic routines that may help to start up computer 2000 and to transfer information between the various components and devices. ROM 2020 or NVRAM may also store other software components necessary for the operation of computer 2000 in accordance with the embodiments described herein.

Computer 2000 may operate in a networked environment using logical connections to remote computing nodes and computer systems through LAN 2016. Chipset 2006 may include functionality for providing network connectivity through a network interface controller (NIC) 2022, such as a gigabit Ethernet adapter. NIC 2022 may be capable of connecting the computer 2000 to other computing nodes over LAN 2016. It should be appreciated that multiple NICs 2022 may be present in computer 2000, connecting the computer to other types of networks and remote computer systems.

Computer 2000 may be connected to a mass storage device 2028 that provides non-volatile storage for the computer. Mass storage device 2028 may store system programs, application programs, other program modules, and data, which have been described in greater detail herein. Mass storage device 2028 may be connected to computer 2000 through a storage controller 2024 connected to chipset 2006. Mass storage device 2028 may consist of one or more physical storage units. Storage controller 2024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 2000 may store data on mass storage device 2028 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 2028 is characterized as primary or secondary storage and the like.

For example, computer 2000 may store information to mass storage device 2028 by issuing instructions through storage controller 2024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 2000 may further read information from mass storage device 2028 by detecting the physical states or characteristics of one or more particular locations within the physical storage units.

In addition to mass storage device 2028 described above, computer 2000 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 2000.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 2028 may store an operating system utilized to control the operation of the computer 2000. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 2028 may store other system or application programs and data utilized by computer 2000, such as management component 2010 and/or the other software components described above.

Mass storage device 2028 or other computer-readable storage media may also be encoded with computer-executable instructions, which, when loaded into computer 2000, transforms the computer into computer capable of implementing the embodiments described herein. These computer-executable instructions transform computer 2000 by specifying how CPUs 2004 transition between states, as described above. Computer 2000 may have access to computer-readable storage media storing computer-executable instructions, which, when executed by computer 2000, may perform operating procedures described above in connection with FIGS. 1-4.

Computer 2000 may also include an input/output controller 2032 for receiving and processing input from a number of input devices, such as a keyboard, a mouse, a touchpad, a touch screen, an electronic stylus, or other type of input device. Similarly, input/output controller 2032 may provide output to a display, such as a computer monitor, a flat-panel display, a digital projector, a printer, a plotter, or other type of output device. It will be appreciated that computer 2000 may not include all of the components shown in FIG. 8, may include other components that are not explicitly shown in FIG. 8, or may utilize an architecture completely different than that shown in FIG. 8.

As described herein, a computing node may be a physical computing node, such as computer 2000 of FIG. 8. A computing node may also be a virtual computing node, such as a virtual machine instance, or a session hosted by a physical computing node, where the computing node is configured to host one or more sessions concurrently.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   one or more processors; and
   one or more non-transitory computer-readable storage media having stored thereon instructions that, upon execution by the one or more processors, cause the one or more processors to perform operations comprising:
   maintaining, for a data chunk, information identifying a data chunk grouping in a network;
   receiving information identifying, for a first node, a node grouping in the network based on a function that the first node performs in the network, the first node included in a computing node network for simulating a gaming environment;
   determining the node grouping in the network corresponds to the data chunk grouping in the network;
   maintaining, for the data chunk, information identifying one or more nodes that are subscribed;
   receiving a request from a second node of the computing node network to subscribe to the data chunk;
   updating the information identifying one or more nodes that are subscribed to indicate the second node is subscribed to the data chunk;
   determining, using the information identifying one or more nodes that are subscribed, that the second node is subscribed to the data chunk; and
   replicating to the first node and the second node respectively:
   the data chunk,
   instructions for recognizing that the data chunk has been downloaded to a respective node and that an executable component that allows the respective node to interface with the data chunk that is replicated to the respective node has not been downloaded to the respective node, and
   instructions for retrieving the executable component by the respective node, wherein the respective node retrieves the executable component to interface with the data chunk.

2. The system of claim 1, wherein the one or more non-transitory computer-readable storage media have stored thereon instructions that, upon execution by the one or more processors, cause the one or more processors to perform further operations comprising:
   receiving a request from the second node to unsubscribe to the data chunk; and
   updating the information identifying one or more nodes that are subscribed to remove an indication the second node is subscribed to the data chunk.

3. The system of claim 1, wherein the one or more non-transitory computer-readable storage media have stored thereon instructions that, upon execution by the one or more processors, cause the one or more processors to perform further operations comprising:
   replicating an update to the data chunk to the first node and the second node.

4. A computer-implemented method comprising:
   maintaining, for a data chunk, information identifying a data chunk grouping in a network;
   receiving information identifying, for a first node, a node grouping in the network based on a function that the first node performs in the network, the first node included in a computing node network for simulating a gaming environment;
   determining the node grouping in the network corresponds to the data chunk grouping in the network;
   maintaining, for the data chunk, information identifying one or more nodes that are subscribed;
   receiving a request from a second node of the computing node network to subscribe to the data chunk;
   updating the information identifying one or more nodes that are subscribed to indicate the second node is subscribed to the data chunk;
   determining, using the information identifying one or more nodes that are subscribed, that the second node is subscribed to the data chunk; and
   replicating to the first node and the second node respectively:
   the data chunk,
   instructions for recognizing that the data chunk has been downloaded to a respective node and that an executable component that allows the respective node to interface with the data chunk that is replicated to the respective node has not been downloaded to the respective node, and
   instructions for retrieving the executable component by the respective node, wherein the respective node retrieves the executable component to interface with the data chunk.

5. The computer-implemented method of claim 4, further comprising:
   receiving a request from the second node to unsubscribe to the data chunk; and updating the information identifying one or more nodes that are subscribed to remove an indication the second node is subscribed to the data chunk.

6. The computer-implemented method of claim 4, further comprising:
replicating an update to the data chunk to the first node and the second node.

7. One or more non-transitory computer-readable storage media having stored thereon instructions that, upon execution by one or more computing devices, cause the one or more computing devices to perform operations comprising:
maintaining, for a data chunk, information identifying a data chunk grouping in a network;
receiving information identifying, for a first node, a node grouping in the network based on a function that the first node performs in the network, the first node included in a computing node network for simulating a gaming environment;
determining the node grouping in the network corresponds to the data chunk grouping in the network;
maintaining, for the data chunk, information identifying one or more nodes that are subscribed;
receiving a request from a second node of the computing node network to subscribe to the data chunk;
updating the information identifying one or more nodes that are subscribed to indicate the second node is subscribed to the data chunk;
determining, using the information identifying one or more nodes that are subscribed, that the second node is subscribed to the data chunk; and
replicating to the first node and the second node respectively:
the data chunk,
instructions for recognizing that the data chunk has been downloaded to a respective node and that an executable component that allows the respective node to interface with the data chunk that is replicated to the respective node has not been downloaded to the respective node, and
instructions for retrieving the executable component by the respective node, wherein the respective node retrieves the executable component to interface with the data chunk.

8. The one or more non-transitory computer-readable storage media of claim 7, wherein the operations further comprise:
receiving a request from the second node to unsubscribe to the data chunk; and
updating the information identifying one or more nodes that are subscribed to remove an indication the second node is subscribed to the data chunk.

9. The one or more non-transitory computer-readable storage media of claim 7, wherein the operations further comprise:
replicating an update to the data chunk to the first node and the second node.

* * * * *